Figure 2:
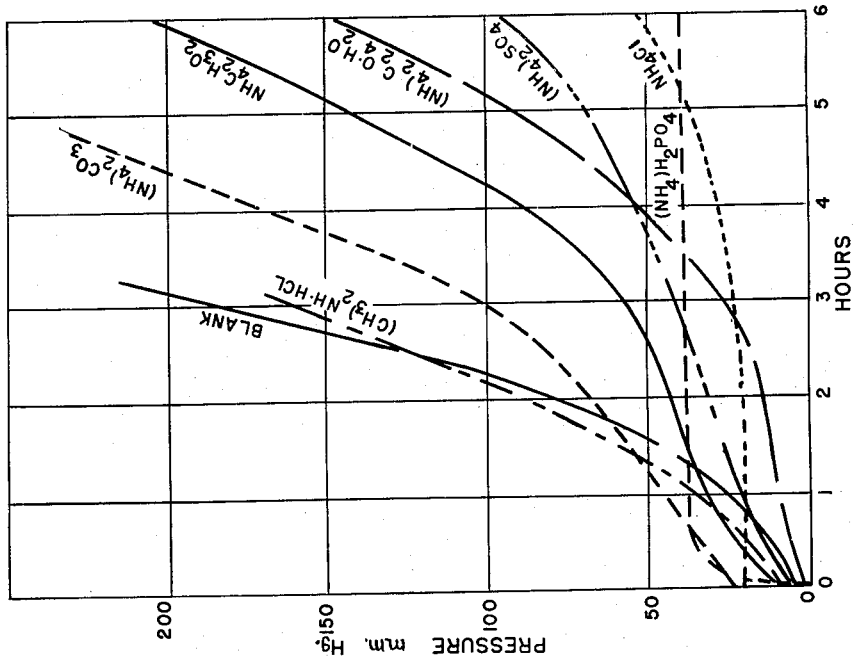

Sept. 27, 1960 G. W. AYERS ET AL 2,954,396
STABILIZATION OF CARBAMATE ESTERS
Filed May 16, 1958 2 Sheets-Sheet 1

INVENTORS
GEORGE W. AYERS
WILLIAM A. KREWER
BY THOMAS W. MARTINEK
LE ROI E. HUTCHINGS
ATTORNEY

Sept. 27, 1960  G. W. AYERS ET AL  2,954,396
STABILIZATION OF CARBAMATE ESTERS
Filed May 16, 1958  2 Sheets-Sheet 2

INVENTORS
GEORGE W. AYERS
WILLIAM A. KREWER
BY THOMAS W. MARTINEK
LE ROI E. HUTCHINGS
ATTORNEY

United States Patent Office 2,954,396
Patented Sept. 27, 1960

2,954,396

STABILIZATION OF CARBAMATE ESTERS

George W. Ayers, Chicago, William A. Krewer, Arlington Heights, and Thomas W. Martinek and Le Roi E. Hutchings, Crystal Lake, Ill., assignors to The Pure Oil Company, Chicago, Ill., a corporation of Ohio Filed May 16, 1958, Ser. No. 735,829

18 Claims. (Cl. 260—482)

This invention relates to a method of stabilization of carbamate esters against decomposition during use, particularly when used as solvents in selective extraction processes. More particularly, the invention relates to the discovery that incorporating small quantities of hydrochloric acid, phosphoric acid, acetic acid, ammonium chloride, ammonium dihydrogen phosphate, and ferric chloride with the carbamate ester solvents inhibits the decomposition and stabilizes the esters.

This invention also relates to the composition including certain carbamate esters containing a sufficient amount of an inhibitor to prevent hydrolysis. The carbamate ester-inhibitor composition may contain from about 5.0 to 50% by weight of water.

The preserving art has developed to the point where numerous inhibitors are known and used for the purpose of preventing polymerization and/or oxidation of organic materials. For instance, various antioxidants are known which prevent the oxidation of carbon atom double bonds in organic esters. It has been discovered in accordance with this invention that carbamate esters of a broad class, to be described, can exhibit two types of break-down, namely, pyrolysis under conditions wherein an essentially anhydrous ester is subjected to elevated temperatures, and hydrolysis which occurs in the presence of water during long-time usage, as for example, during storage or in a solvent extraction process. In accordance with this invention, it has been discovered that the second type of break-down can be inhibited by incorporating small quantities of certain inhibiting substances.

Accordingly, a primary object of this invention is to provide a process for stabilizing carbamate esters against decomposition during use.

Another object is to provide a composition of matter comprising certain carbamate esters and sufficient amounts of a decomposition inhibitor, or mixtures of same, to stabilize the carbamate esters.

Another object of the invention is to provide a method of solvent extraction employing as solvents certain carbamate esters wherein the decomposition of the carbamate esters during use in the extraction stage, or during recovery from the extract or raffinate phase, or during other processes involving conditions conducive to decomposition, is prevented by maintaining or adding one or more inhibitors thereto.

These and other objects will be described or become apparent as the description of the invention proceeds.

Figure 1:
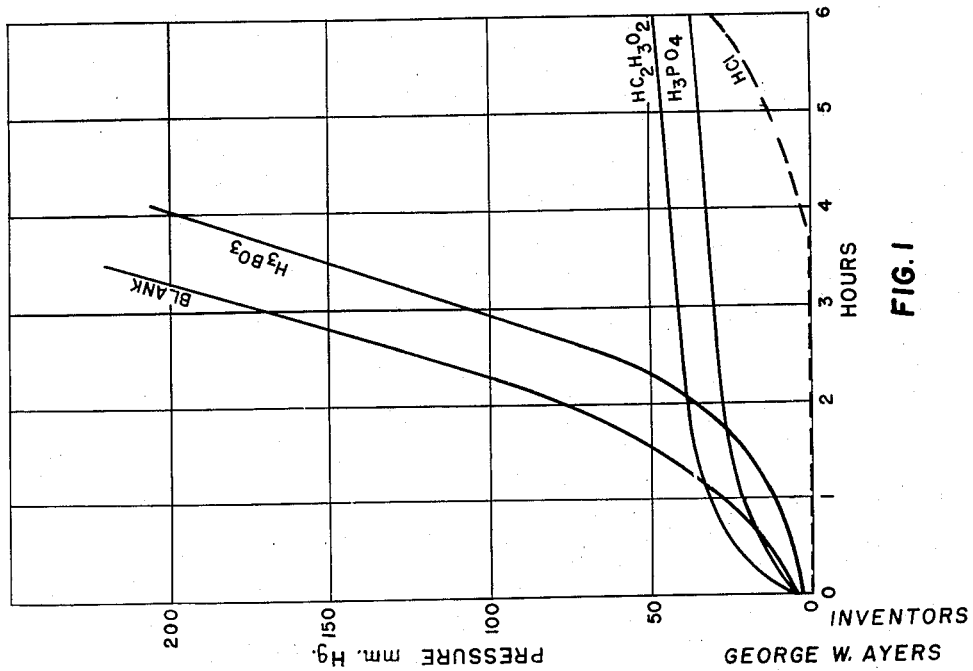
Figure 4:
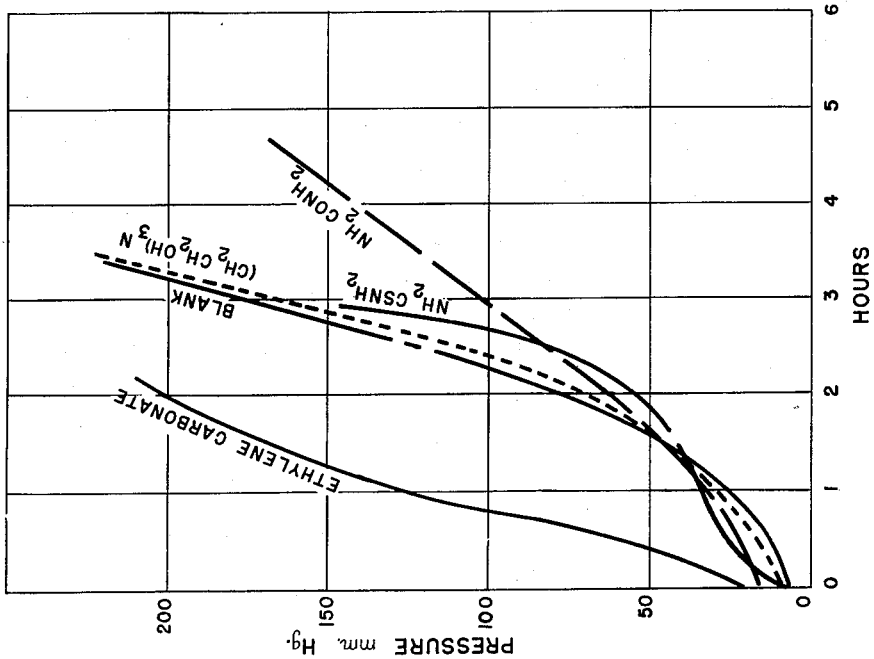
Figure 3:
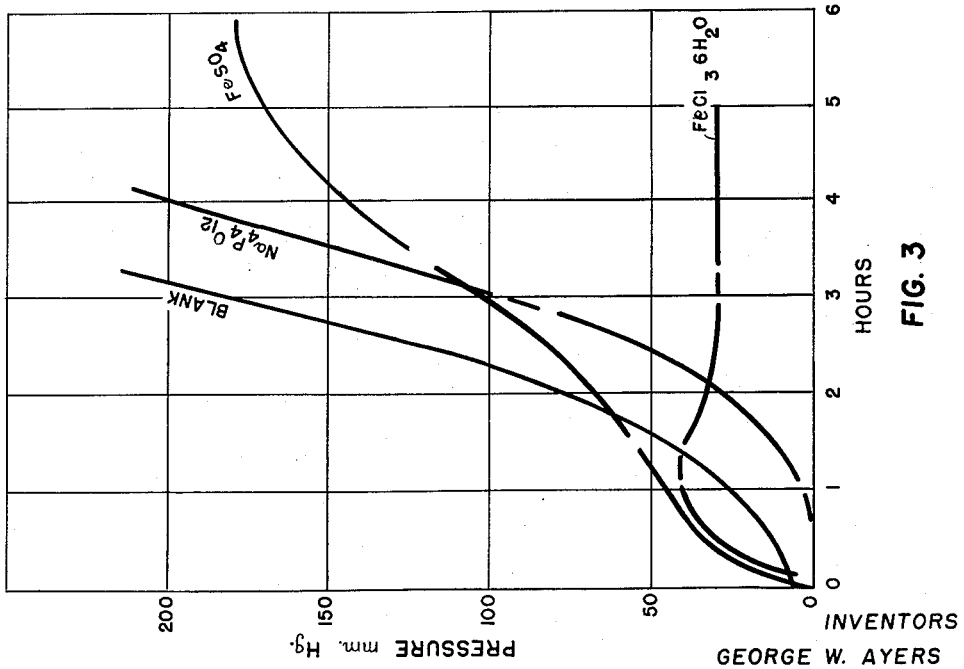

Figures 1, 2, 3 and 4 are graphic representations of the relative effectiveness of various materials tested, using time in hours as the abscissa and carbon dioxide pressures as the ordinates.

The carbamate esters with which the present invention finds utility are esters of carbamic acid, or N-substituted carbamic acids, in which the ethyl group contains at least one polar constituent. These compounds may be represented by the general formula:

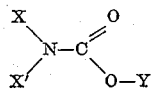

wherein X and/or X' are substituent groups which may broadly be hydrogen, alkyl groups, cycloalkyl groups, aryl groups, polar-substituted alkyl groups, polar-substituted aryl groups, and heterocyclic groups and Y is a polar-substituted alkyl, aryl, alkaryl, aralkyl, or cycloalkyl group. More specifically, X and/or X' may be selected substituents from the following groups: hydrogen, methyl, ethyl, propyl, isopropyl, butyl, isobutyl, tertiary butyl, amyl, isoamyl, cyclopentyl, cyclohexyl, cycloheptyl, phenyl, tolyl, xylyl, hydroxymethyl, hydroxyethyl, hydroxypropyl, hydroxyisopropyl, hydroxybutyl, hydroxyisobutyl, hydroxyamyl, hydroxyisoamyl, cyanomethyl, cyanoethyl, cyanopropyl, cyanobutyl, cyanoisobutyl, cyanoamyl, cyanoisoamyl, methoxymethyl, methoxyethyl, methoxypropyl, methoxyisopropyl, methoxybutyl, methoxyisobutyl, methoxyamyl, methoxyisoamyl, acetamidoethyl, acetamidopropyl, acetamidoisopropyl, acetamidobutyl, acetamidoisobutyl, acetamidoamyl, carboethoxyethyl, carboethoxypropyl, carboethoxyisopropyl, carboethoxybutyl, and carboethoxyamyl. Additional specific substituent groups include nitrophenyl, i.e., 4-nitrophenyl, cyanophenyl, i.e., 4-cyanophenyl, morpholinyl, pyridyl and piperidinyl and the like.

Y in the above formula is a polar-substituted alkyl, aryl, alkaryl, aralkyl or cycloalkyl group including the aforementioned hydroxyalkyl, cyanoalkyl, methoxyalkyl, acetimidoalkyl and carboethoxyalkyl groups in relation to the definition of X and X'. Other polar groups that may be used in place of or along with the foregoing are the fluoro, chloro, iodo and bromo groups.

Carbamate esters of the foregoing class are used in a number of processes in which the stability of the esters over an extended period of time is of prime importance, particularly where the esters are subject to temperatures higher than ambient temperatures. For example, β-hydroxyethyl dimethylcarbamate is an excellent solvent-extraction agent for aromatic hydrocarbons. This solvent is generally used with small quantities of water for the purpose of increasing the selectivity and facilitating phase separation. In the practice of solvent extraction, the solvent is separated from the extract and raffinate phases by the application of water dilution and/or the use of an auxiliary non-polar solvent, which processes are followed by heating steps, including distillation or flash vaporization, wherein the solvent in admixture with water is heated to temperatures above 150° F. and as high as the boiling point of the particular esters. The solvent receovered from such processing is recycled to the primary extraction zone. Since the various steps of solvent extraction and recovery of solvent are known in the art, the invention herein does not relate to the use of the ester in any particular solvent-extraction process. The invention is, accordingly, intended to cover any use of the esters wherein decomposition may occur.

At ambient temperatures, the hydrolysis of β-hydroxyethyl dimethylcarbamate in the presence of about ¼ of its volume of water is practically negligible, even where the contact is over extended periods. At temperatures above approximately 178° F., the hydrolysis reaction rate increases rapidly for this individual ester. In accordance with the invention, it has been found that a mixture of a carbamate ester, as for example β-hydroxyethyl dimethylcarbamate, and a small amount, that is, 0.05 to 1.0%, of hydrochloric acid, phosphoric acid, ammonium chloride, ammonium dihydrogen phosphate, and ferric chloride exhibits a greatly decreased hydrolysis rate.

Pyrolysis of β-hydroxyethyl dimethylcarbamate at elevated temperatures results in the production of dimethylammonium dimethylcarbamate, ethylene glycol, and β-dimethylaminoethanol. This reaction takes place at a very slow rate and for all practical purposes may be ignored in the ordinary use of the carbamate esters. However, in the hydrolysis reaction or break-down in the presence of water, particularly at high temperatures, β-hydroxyethyl dimethylcarbamate forms dimethylammonium dimethylcarbamate, ethylene glycol, and carbon dioxide. Since carbon dioxide is evolved in the hydrolysis reaction, this forms a simple means of evaluating the stability of the ester compositions. Accordingly, the mixture of the carbamate ester, water, and the additive under test or used for imparting stability, can be maintained at any definite temperature in a closed system and the rate of decomposition can be measured quantitatively by determining the pressure increase in the system due to release of carbon dioxide. The actual hydrolysis reaction and its products can be measured quantitatively by potentiometric titration of the mixture. After an individual test, the dimethylammonium dimethylcarbamate formed during the hydrolysis is readily titrated with hydrochloric acid. Materials having a definite alkaline reaction cannot be evaluated by this method and appear to be inoperative.

In order to demonstrate the invention, a number of substances were evaluated as possible retarding agents for the hydrolysis of β-hydroxyethyl dimethylcarbamate. These tests were conducted by placing 25 grams of aqueous β-hydroxyethyl dimethylcarbamate, containing 20% by weight of water, and 0.2 to 1.0% by weight of the prospective retarding agent in a glass flask immersed in a bath of boiling water. The glass flask containing the ester and additive was sealed to the bottom of a water-cooled vertical condenser and the exit end of the condenser was in turn sealed to a mercury manometer. During the course of the experiments, the pressure increases in the system were noted and recorded at definite intervals of time. In some instances the ester residue was titrated potentiometrically with hydrochloric acid to determine the amount of dimethylammonium dimethylcarbamate formed, and hence the percent of hydrolysis of the ester according to the equation,

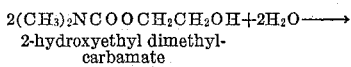
2-hydroxyethyl dimethyl-
carbamate
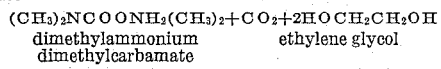
dimethylammonium      ethylene glycol
dimethylcarbamate The results are shown in the following table.

TABLE I

Effect of added substances on the hydrolysis of 2-hydroxyethyl dimethylcarbamate

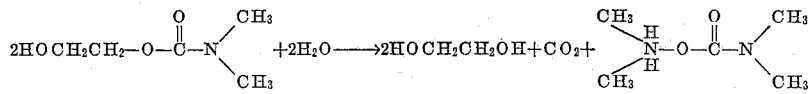

[Added substance was heated at 100° C. in a closed system with 2-hydroxyethyl dimethylcarbamate containing 20% water and pressure rise was used as a measure of hydrolysis; in some cases the residue was titrated to given an amount of dimethylammonium dimethylcarbamate formed and from this the percent 2-hydroxyethyl dimethylcarbamate hydrolyzed was obtained]

| Run No. | Added substance | Percent by Wt. of added substance | Solubility of added substance in Carbamate | Pressure rise (mm.Hg) after 6 hrs. | Percent hydrolyzed after 6 hrs. |
|---|---|---|---|---|---|
| 1 | None (straight 2-hydroxyethyl dimethylcarbamate) | | | 221 (3.5 hrs.) | 0.58 |

(A) STABILIZERS

| Run No. | Added substance | Percent by Wt. of added substance | Solubility of added substance in Carbamate | Pressure rise (mm.Hg) after 6 hrs. | Percent hydrolyzed after 6 hrs. |
|---|---|---|---|---|---|
| 2 | (2-hydroxyethyl dimethylcarbamate after addition of HCl and redistillation). | | | 41 | 0.02 |
| 3 | Hydrochloric acid (37% solution of HCl in water) | 0.2 | Soluble | 30 | |
| 4 | Phosphoric acid (85% $H_3PO_4$) | 1.0 | do | 40 (4.67 hrs.) | |
| 5 | Acetic acid ($CH_3COOH$) | 0.2 | do | 57 | 0.01 |
| 6 | Ammonium dihydrogen phosphate (($NH_4$)$H_2PO_4$) | 1.0 | Partially soluble | 44 | |
| 7 | Ammonium chloride ($NH_4Cl$) | 1.0 | do | 50 | 0.17 |
| 8 | Ferric chloride ($FeCl_3$.$6H_2O$) | 1.0 | do | 30 (5 hrs.) | |

(B) SUBSTANCES SHOWING LITTLE OR NO STABILIZATION

| Run No. | Added substance | Percent by Wt. of added substance | Solubility of added substance in Carbamate | Pressure rise (mm.Hg) after 6 hrs. | Percent hydrolyzed after 6 hrs. |
|---|---|---|---|---|---|
| 9 | Ammonium sulfate (($NH_4$)$_2SO_4$) | 1.0 | Partially soluble | 95 | |
| 10 | Boric acid ($H_3BO_3$) | 1.0 | Soluble | 187 (4 hrs.) | |
| 11 | Dimethylammonium chloride (($CH_3$)$_2NH.HCl$) | 1.0 | Partially soluble | 160 (3 hrs.) | |
| 12 | Ammonium carbonate (($NH_4$)$_2CO_3$) | 1.0 | Soluble | 230 (4 hrs.) | |
| 13 | Ammonium acetate ($NH_4C_2H_3O_2$) | 1.0 | do | 178 | |
| 14 | Ammonium oxalate (($NH_4$)$_2C_2O_4.H_2O$) | 1.0 | Partially soluble | 138 | |
| 15 | Urea ($NH_2CONH_2$) | 1.0 | Soluble | 163 (4.5 hrs.) | |
| 16 | Thiourea ($NH_2CSNH_2$) | 1.0 | do | 140 (3 hrs.) | |
| 17 | Triethanolamine (($HOCH_2CH_2$)$_3N$) | 1.0 | do | 218 (3.33 hrs.) | |
| 18 | Ethylene carbonate | 1.0 | do | 200 (2 hrs.) | |
| 19 | Sodium metaphosphate ($Na_4P_4O_{12}$) | 1.0 | Partially soluble | 205 (4 hrs.) | |
| 20 | Ferrous sulfate ($FeSO_4.7H_2O$) | 1.0 | do | 180 | |
| 21 | Sodium oxalate ($Na_2C_2O_4.4H_2O$) | 1.0 | do | | 2.2 |

Examples of polar-substituted carbamic acid esters coming within the scope of this invention are: 2-hydroxyethyl N-methyl carbamate, 2-hydroxyethyl N-ethyl carbamate, 2-hydroxyethyl N-i-propyl carbamate, 2-hydroxyethyl N,N-dimethyl carbamate, 2-chloroethyl N-methyl carbamate, 2-chloroethyl N-ethyl carbamate, 2-chloroethyl N-isopropyl carbamate, 2-chloroethyl N,N-dimethyl carbamate, 3-chloropropyl N-methyl carbamate, 3-chloropropyl N-ethyl carbamate, 3-chloropropyl N-isopropyl carbamate, 3-chloropropyl N,N-dimethyl carbamate, 2-iodoethyl N-methyl carbamate, 2-iodoethyl N-ethyl carbamate, 2-iodoethyl N-i-propyl carbamate, 2-iodoethyl N,N-dimethyl carbamate, 2-fluoroethyl N-methyl carbamate, 2-fluoroethyl N-ethyl carbamate, 2-fluoroethyl N-i-propyl carbamate, 2-fluoroethyl N,N-dimethyl carbamate, 2-bromoethyl N-methyl carbamate, 2-bromoethyl N-ethyl carbamate, 2-bromoethyl N-i-propyl carbamate, 2-bromoethyl N,N-dimethyl carbamate, hydroxyphenyl N-methyl carbamate, hydroxyphenyl N-ethyl carbamate, hydroxyphenyl N-isopropyl carbamate, hydroxyphenyl N,N-dimethyl carbamate and chlorophenyl N-methyl carbamate.

The physical properties of certain of these carbamates are shown in the following table:

TABLE II

*Physical properties of carbamates tested*

| Carbamate | B.P. (°C./mm. Hg) | B.P. (calc'd) (°C. @ 760 mm.) | Ref. Index ($n^{20°C.}/D$) |
|---|---|---|---|
| 2-hydroxyethyl N-methyl | 107–108/1.2 | 275 | 1.4516 |
| 2-hydroxyethyl N-ethyl | 139–142/8 | 275 | 1.4532 |
| 2-hydroxyethyl N-i-propyl | 114–122/0.5 | 335 | 1.4520 |
| 2-hydroxyethyl N,N-dimethyl | 82–86/1.2 | 245 | 1.4497 |

The invention finds particular application in the use of the polar-substituted carbamic acid esters in liquid-liquid or liquid-vapor solvent extraction systems wherein the objective is to extract a predominance of the aromatic hydrocarbons or alkyl-substituted homologues from admixture with non-aromatic hydrocarbons. For this purpose, the feed hydrocarbon containing the desired aromatics is treated in a single tower, or in a series of towers, with one or more successive portions, or is treated continuously with the carbamate solvent. The portions of solvent or the solvent-to-feed ratio in the successive or continuous treatments may vary in accordance with the extent of extraction sought. The process may be batchwise, or countercurrent flow in a vertical tower may be used.

In order to illustrate this aspect of the invention, the feed hydrocarbon containing aromatics is introduced into a primary extraction tower wherein the feed passes in counter-current contact with a carbamate solvent which contains an hydrolysis-inhibiting additive, according to this invention. This treatment results in a raffinate containing a small amount of solvent and a predominance of the paraffinic hydrocarbons, and an extract phase containing solvent and a high proportion of aromatics. The raffinate phase is treated to water washing in order to remove the small amount of carbamate solvent therefrom and the solvent so recovered is recycled to the primary extraction tower. The extract phase may be treated by distillation in order to remove the solvent. About 5 to 20% by weight of water is used with the solvent during the extraction. Accordingly, the distillation results in an overhead of semi-purified aromatic hydrocarbons and a bottoms fraction which comprises the solvent-water mixture to be recycled to the primary extraction. This bottoms fraction is tested to make sure it contains sufficient hydrolysis inhibitor, and then is recycled to the primary extraction tower, with or without any adjustment of the water content necessary for the degree of extraction that is to be accomplished. The extract phase may also be treated with a high-boiling paraffinic hydrocarbon containing no contaminating unsaturated hydrocarbons to dissolve the aromatics and produce a denuded solvent phase. Following this treatment, the denuded solvent phase is combined with the hydrolysis inhibitor in accordance with this invention, and likewise recycled to the primary extraction tower.

In order to further demonstrate the invention with a non-limiting example, an aromatic feed consisting of 32% by volume of benzene and 68% by volume of paraffins is treated in an extraction tower with a solvent consisting of 80% by volume of 2-hydroxyethyl N,N-dimethylcarbamate and 20% by volume of water using the following operating conditions in the tower:

Extraction tower operating conditions:
- Solvent/feed ratio _____ 6/1
- Reflux/feed ratio _____ 1.7/1
- Solvent rate _____ gal. p. hr__ 3.0
- Feed rate _____ gal. p. hr__ 0.51
- Reflux rate _____ gal p. hr__ 0.88

The extract is treated to distillation, with water reflux, at a still-pot temperature of 229° F. The paraffinic product is washed with water to remove the trace amount of solvent that is present. The solvent is treated with sufficient phosphoric acid to substantially eliminate hydrolysis of the solvent during the extraction step. The following product rates and compositions are obtained:

Product rates and compositions:
- Benzene _____ 0.16 gal. p. hr.
  - 99% by vol. benzene.
  - 1% by vol. paraffins.
- Paraffin product _____ 0.35 gal. p. hr.
  - 1% by vol benzene.
  - 99% by vol. paraffin.

When applying the method of this invention to a solvent-extraction process, the technique of preserving the solvent by means of an inhibitor to retard hydrolysis is applicable to recovery of economic amounts of aromatics, including benzene and alkyl homologues thereof such as toluene, xylenes, that is, o-xylene, m-xylene and p-xylene, and also ethyl benzene. Such feed materials as petroleum distillates, naphthas, gasoline, kerosine, fuel oil fractions and gas oil fractions may also be subjected to solvent extraction with the carbamate esters disclosed herein while applying the method of stabilization which constitutes this invention. One suitable feed is the class of products known in the art at catalytic reformates which contain desirable quantities of aromatics. Catalytic reformates are obtained by treating naphthas to reforming, dehydrogenation, hydrocracking and dehydrocyclization at temperatures ranging from 850° F. to 1000° F. with pressures up to about 500 p.s.i.g. in the presence of a metal-containing catalyst.

As a more specific illustration, catalytic reformates obtained as a result of the treatment of a virgin naphtha (BR 175° F.–400° F., API gravity 50° to 60°) with a platinum-alumina catalyst at 875° F. to 975° F. and pressures ranging from 200 to 500 p.s.i.g. may be used. Reformates so produced contain from about 30 to 55 vol. percent of aromatics and constitute a preferred feed for the present process. For example, reformates produced by reforming a 200°–400° F. virgin naphtha at about 930° F. and 325 p.s.i.g. in the presence of a catalyst comprising about 0.1 wt. percent of platinum on an alumina base, are representative. In general, these reformates have a boiling range of about 125° to 400° F., an API gravity of 40° to 50°, and an aromatic content of 45–55 volume percent. A particularly suitable reformate is obtained by subjecting a charge naphtha having a boiling range of 178° F. to 389° F., an API gravity of 59.1°, a RON clear, of 44.6, a RON+0.3 TEL of 71.4 and containing 0.01% sulfur, about 91.0 vol. percent of paraffins and naphthenes, 1.0 vol. percent olefins, and 8.0 vol. percent aromatics, to reforming at about 930° F., to produce a product having an API gravity of 49.2°, and IBP of 128° F. and EBP of 405° F., a RON clear of 89.4, a RON+.3 cc. TEL of 98.2, and containing about 48.0 vol. percent paraffins and naphthenes, 1.0 vol percent olefins and 51.0 vol percent of aromatics. By precise fractionation and blending to different octane numbers, it was determined that this reformate feed material exhibited the following analysis:

TABLE III

*Aromatics in reformate feed*

Aromatic: Vol. percent
- Benzene _____ 4.19
- Toluene _____ 13.1
- Mixed xylene and ethyl benzene _____ 16.51
- $C_9$ and heavier _____ 17.2

In general, the method of stabilization by the addition of one or more of a selected group of substances, namely, acetic acid, phosphoric acid, hydrochloric acid, ammonium dihydrogen phosphate, ammonium chloride, ferric chloride, and mixtures thereof, is applicable to the wide range of conditions under which the carbamate esters disclosed herein may be used. Hydrolysis and other decomposition of these carbamate esters proceeds more rapidly at elevated temperatures and is less of a problem at low temperature. In general, these carbamate esters require stabilization at temperatures from about 25° C. to 190° C. The process of this invention finds particular application during solvent extraction where temperatures ranging from about 0° C. to as high as 80° C. are used, with pressures ranging from atmospheric to 10 or 15 p.s.i.g.

The method of stabilization of the invention has been demonstrated by a number of tests which were conducted under accelerated conditions. Accordingly, a time period of about 6 hours, as shown on the graphs, represents about 6 weeks time of actual use as during an extraction process. Also, the "50 mm. Hg" on the pressure scale of the graphs represents about the maximum amount of decomposition that can be tolerated in any given situation. Among the various materials tested, only those which prevent the pressure of escaping carbon dioxide from rising to a value about 50/mm. of mercury in a period of about 6 hours are to be considered as functioning properly to inhibit the decomposition. As seen from the graphs, certain of the materials lose their effectiveness in a relatively short time. Also, the information given herein emphasizes the fact that one cannot predict just how a given material will function in this environment.

The following table illustrates specific examples of compositions that may be formulated in accordance with this invention:

TABLE IV

| Composition No. | Ingredients | Wt. Percent |
|---|---|---|
| 1 | 2-hydroxyethyl N-methyl carbamate | 99.95 |
|   | hydrochloric acid | 0.05 |
| 2 | 2-hydroxyethyl N-methyl carbamate | 99.90 |
|   | acetic acid | 0.10 |
| 3 | 2-hydroxyethyl N-ethyl carbamate | 99.00 |
|   | phosphoric acid | 1.0 |
| 4 | 2-hydroxyethyl N-ethyl carbamate | 99.5 |
|   | ammonium chloride | 0.5 |
| 5 | 2-hydroxyethyl N,N-dimethyl carbamate | 99.5 |
|   | ammonium dihydrogen phosphate | 0.5 |
| 6 | 2-hydroxyethyl N,N-dimethyl carbamate | 79.5 |
|   | ammonium dihydrogen phosphate | 0.5 |
|   | water | 20.0 |
| 7 | 2-hydroxyethyl N-i-propyl carbamate | 70.0 |
|   | phosphoric acid | 2.0 |
|   | hydrochloric acid | 2.0 |
|   | water | 26.0 |
| 8 | 2-hydroxyethyl N-N-dimethyl carbamate | 78.0 |
|   | phosphoric acid | 1.0 |
|   | hydrochloric acid | 1.0 |
|   | water | 20.0 |

Although the inhibitors of this invention may be used to form a stable composition with the described carbamate esters with or without between about 5.0 to 50% by weight of water, or may be used to prevent decomposition at any desired point in a processing system, the preferred application is during use as a selective solvent or while said selective solvent is being subjected to recovery. For the various purposes described herein, the inhibitors may be added to the carbamate esters in the prescribed amounts before use, during storage, or added continuously or intermittently before or during the subjection of the carbamate ester to decomposition conditions, particularly hydrolysis conditions. Decomposition by way of the hydrolysis reaction may occur in systems wherein the carbamate esters are used without water because of leaks in steam coils and the difficulties always experienced in excluding water from a system. Accordingly, the invention may be applied where the carbamate esters are used under ostensibly anhydrous conditions.

What is claimed is:

1. The method of stabilization of N-substituted alkyl carbamates against hydrolytic decomposition which comprises adding thereto about 0.05 to 5.0 percent by weight of a substance selected from the group of acetic acid, phosphoric acid, hydrochloric acid, ammonium dihydrogen phosphate, ammonium chloride, ferric chloride, and mixtures thereof.

2. The method in accordance with claim 1 in which the substance is acetic acid.

3. The method in accordance with claim 1 in which the substance is phosphoric acid.

4. The method in accordance with claim 1 in which the substance is hydrochloric acid.

5. The method in accordance with claim 1 in which the substance is ammonium dihydrogen phosphate.

6. The method in accordance with claim 1 in which the substance is ammonium chloride.

7. The method in accordance with claim 1 in which the substance is ferric chloride.

8. The method of stabilizing carbamate esters of the general formula

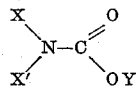

wherein X and X' are the same or different substituent radicals selected from the group consisting of hydrogen, alkyl, cycloalkyl, aryl, alkaryl, aralkyl, polar-substituted alkyl, polar-substituted aryl and heterocyclic radicals, and Y is selected from the group of polar-substituted alkyl, polar-substituted aryl, polar-substituted alkaryl, polar-substituted aralkyl and polar-substituted cycloalkyl radicals against hydrolytic decomposition which comprises adding thereto about 0.05 to 5.0 percent by weight of a substance selected from the group consisting of acetic acid, phosphoric acid, hydrochloric acid, ammonium dihydrogen phosphate, ammonium chloride, ferric chloride, and mixtures thereof.

9. The method in accordance with claim 8 in which said carbamate ester is 2-hydroxyethyl N-N-dimethyl carbamate.

10. The method in accordance with claim 8 in which said carbamate ester is 2-hydroxyethyl N-methyl carbamate.

11. The method in accordance with claim 8 in which said carbamate ester is 2-hydroxyethyl N-isopropyl carbamate.

12. The process of separating aromatic hydrocarbons and homologues thereof from non-aromatic hydrocarbon mixtures containing same which comprises contacting said mixture with a polar-N- substituted carbamate solvent in an extracting treatment in the presence of water, separating the composite mixture into two components consisting of an extract phase and a raffinate phase, separating non-aromatic hydrocarbons and solvent from said raffinate phase, separating aromatic hydrocarbons and solvent from said extract phase, while maintaining about 0.05 to 5.0 percent by weight of a substance selected from the group consisting of acetic acid, phosphoric acid, hydrochloric acid, ammonium dihydrogen phosphate, ammonium chloride, ferric chloride, and mixtures thereof in solution in said solvent to prevent hydrolytic decomposition of said solvent.

13. The method in accordance with claim 12 in which the solvent contains about 5 to 20% by weight of water.

14. The method in accordance with claim 13 in which said solvent is 2-hydroxyethyl-N,N-dimethyl carbamate.

15. The method in accordance with claim 13 in which said carbamate ester is 2-hydroxyethyl N-methyl carbamate.

16. The method in accordance with claim 13 in which said carbamate ester is 2-hydroxyethyl N-isopropyl carbamate.

17. In the process of separating aromatic hydrocarbons and homologues thereof from non-aromatic hydrocarbons wherein a polar-N-substituted carbamate ester is used as the selective solvent to form an extract phase and a raffinate phase and said solvent is recovered from said phases, the method of preventing the hydrolytic decomposition of said solvent during said recovery which comprises maintaining a sufficient amount of a substance selected from the group consisting of acetic acid, phosphoric acid, hydrochloric acid, ammonium dihydrogen phosphate, ammonium chloride, ferric chloride, and mixtures thereof, in said solvent.

18. A composition of matter comprising a major portion of a ploar-N-substituted carbamate ester and a small amount of a substance selected from the group consisting of acetic acid, phosphoric acid, hydrochloric acid, ammonium dihydrogen phosphate, ammonium chloride, ferric chloride, and mixtures thereof.

References Cited in the file of this patent

UNITED STATES PATENTS

| | | |
|---|---|---|
| 2,333,917 | Christ et al. | Nov. 9, 1943 |
| 2,386,927 | Boyd | Oct. 16, 1945 |
| 2,594,044 | Doder | Apr. 22, 1952 |
| 2,617,784 | Slocombe et al. | Nov. 11, 1952 |
| 2,620,349 | Slocombe | Dec. 2, 1952 |
| 2,666,752 | Grummitt et al. | Jan. 19, 1954 |
| 2,692,874 | Langerak | Oct. 26, 1954 |